(12) United States Patent
Bland et al.

(10) Patent No.: US 8,196,853 B2
(45) Date of Patent: Jun. 12, 2012

(54) AERODYNAMICALLY STABILIZED INSTRUMENT PLATFORM

(75) Inventors: Geoffrey L. Bland, Wallops, VA (US);
Ted K. Miles, Onancock, VA (US)

(73) Assignee: The United States of America, as represented by the Administrator of the National Aeronautics and Space Administration, Washington, DC (US)

( * ) Notice: Subject to any disclaimer, the term of this patent is extended or adjusted under 35 U.S.C. 154(b) by 162 days.

(21) Appl. No.: 12/779,494

(22) Filed: May 13, 2010

(65) Prior Publication Data

US 2011/0278393 A1     Nov. 17, 2011

(51) Int. Cl.
*B64C 31/06*     (2006.01)

(52) U.S. Cl. .................... 244/1 TD; 244/1 R; 244/155 R

(58) Field of Classification Search ................ 244/1 TD, 244/1 R, 155 R
See application file for complete search history.

(56) References Cited

U.S. PATENT DOCUMENTS

| | | | | |
|---|---|---|---|---|
| 2010/0308174 A1* | 12/2010 | Calverley | .................. | 244/155 A |
| 2011/0121570 A1* | 5/2011 | Bevirt et al. | .................... | 290/44 |
| 2011/0174932 A1* | 7/2011 | Tellem | ...................... | 244/155 R |

* cited by examiner

*Primary Examiner* — J. Woodrow Eldred

(57) ABSTRACT

A suspension apparatus for suspending instrumentation from an airborne platform may include a generally longitudinal boom having a payload end and a tail end. Yaw and pitch stabilizers may be disposed at the tail end of the boom. A mast that may be selectively translatable on the boom may connect the boom to a tether line of the airborne platform. The payload may be attached to the payload end of the boom. The mast may be positioned axially along the boom at the center of gravity of the combination of the payload, boom, pitch stabilizer, and yaw stabilizer.

18 Claims, 3 Drawing Sheets

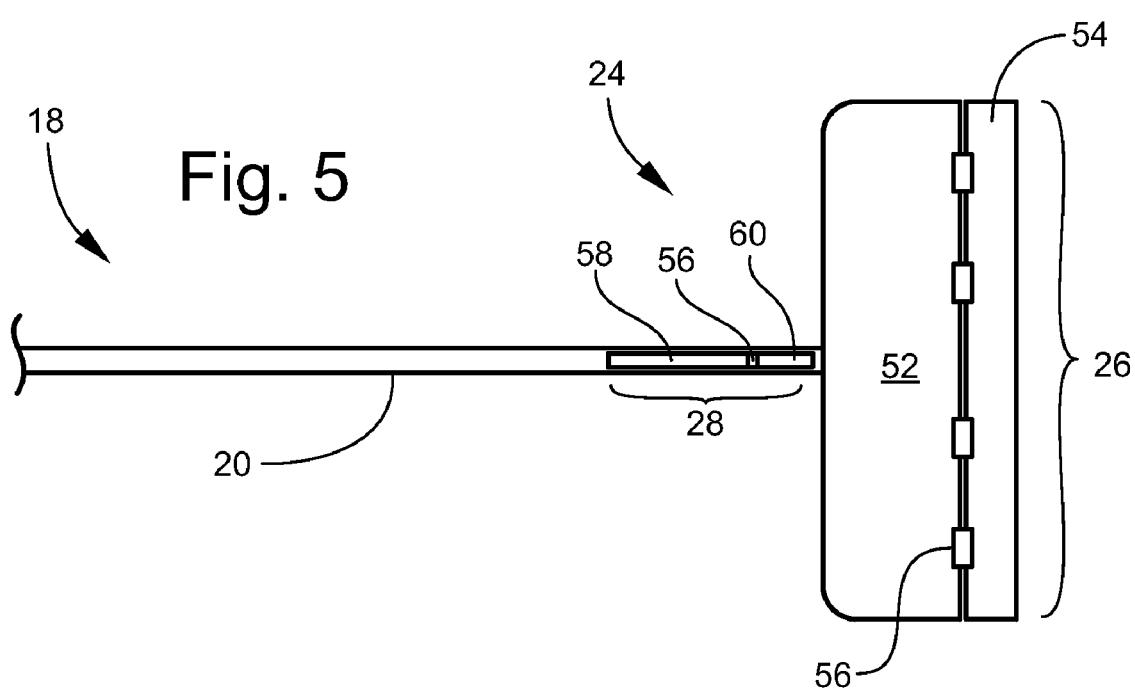

AERODYNAMICALLY STABILIZED INSTRUMENT PLATFORM

ORIGIN OF INVENTION

The invention described herein was made by employees of the United States Government, and may be manufactured and used by or for the Government for governmental purposes without the payment of any royalties thereon or therefore.

FIELD OF THE INVENTION

The invention relates to apparatus and methods for suspending instruments from lines or tethers fixed to airborne platforms.

BACKGROUND

Airborne platforms such as, for example, kites, balloons, and blimps, may be used to suspend instrumentation above the earth's surface. Such airborne platforms may be favored because they are inexpensive, light in weight, portable, and easy to deploy. The instrumentation suspended from the airborne platforms may include, for example, imaging devices and various sensors. Particularly for imaging devices, it may be important to stabilize the instrumentation as much as possible.

The airborne platforms may include a line or tether that may have one end fixed to the airborne platform and the other end fixed to a control point on the ground, such as a winch or a human being. FIG. 1 shows an airborne platform 10 fixed to a tether 12. The tether 12 may be connected to a winch 14 located on an operating surface 16. The airborne platform 10 may be, for example, a kite, balloon, blimp, etc. The operating surface 16 may be the ground or a structure on the ground or water. The tether 12 may be used to suspend instrumentation (not shown in FIG. 1) above the surface 16.

The Picavet suspension system (named after Pierre L. Picavet) is a traditional method for suspending cameras from kite lines. The Picavet system uses a pulley and line arrangement to level an instrument platform and reduce the pointing motion during flight of a kite. The bridle line of the Picavet system may be prone to tangling. In addition, the Picavet system includes several moving parts that may jam or otherwise fail.

Vaisala (Boulder, Colo., USA) manufactures a TetherSonde System for tethered blimps. The TetherSonde System incorporates a mounting technique that translates tether motion directly to the instrument. Translating the tether motion directly to the instrument may result in undesirable movement of the instrument. The TetherSonde system may require a complex moving part in the form of a pivot attachment.

A need exists for a suspension apparatus for instrumentation that is light-weight and simple to construct, while providing the stability needed for the instrumentation.

SUMMARY

It is an object of the invention to provide an apparatus for suspending instrumentation from the tether of an airborne platform.

In one aspect, a suspension apparatus for suspending a payload from an airborne platform may include a boom having a longitudinal axis, a payload end, and a tail end. A yaw stabilizer made of a rigid material may be disposed at the tail end of the boom. A pitch stabilizer made of a rigid material may be disposed at the tail end of the boom. A mast may be selectively translatable along the boom. When the payload is attached to the payload end of the boom, the mast may be positioned axially along the boom at the center of gravity of the combination of the payload, boom, pitch stabilizer, and yaw stabilizer.

The apparatus may further include an airborne platform having a tether extending from the airborne platform to a control point. A suspension line may be fixed at one end to the mast and at another end to the tether of the airborne platform.

In another aspect, a method of suspending a payload from the tether of an airborne platform may include providing a suspension apparatus. The suspension apparatus may include a boom having a longitudinal axis, a payload end, and a tail end. A rigid yaw stabilizer may be disposed at the tail end of the boom. A rigid pitch stabilizer may be disposed at the tail end of the boom. A mast may be selectively translatable along the boom. The method may include fixing the mast axially along the boom at the center of gravity of the combination of the payload, boom, pitch stabilizer, and yaw stabilizer.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 5 is a side view of the tail end of another embodiment of a suspension apparatus.

DETAILED DESCRIPTION

A suspension apparatus may include a passive device that uses aerodynamic forces to stabilize an instrument package suspended from, for example, a kite, tethered blimp, or balloon. The suspension apparatus may use the aerodynamic forces to dampen motions and maintain orientation of the instruments. The suspension apparatus may be light in weight, simple to construct, and have no moving parts. The suspension apparatus may be suspended on a line that enables the instruments to be free of direct (small scale) motions of the tether.

The suspension apparatus may be useful, for example, for a variety of remote sensing and in-situ observations using kites, tethered balloons, and blimps.

Figure 1:
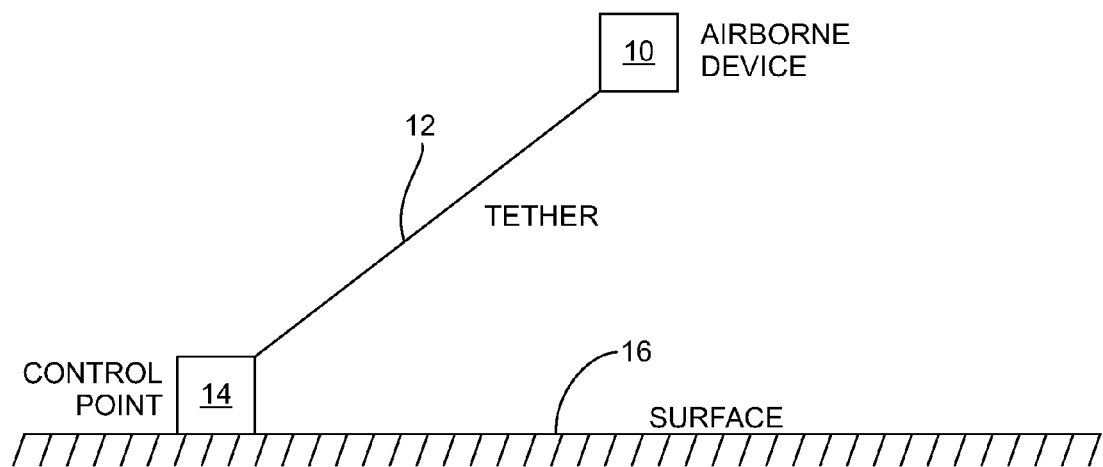
FIG. 1 is a schematic drawing of a tethered airborne platform.
Figure 2:
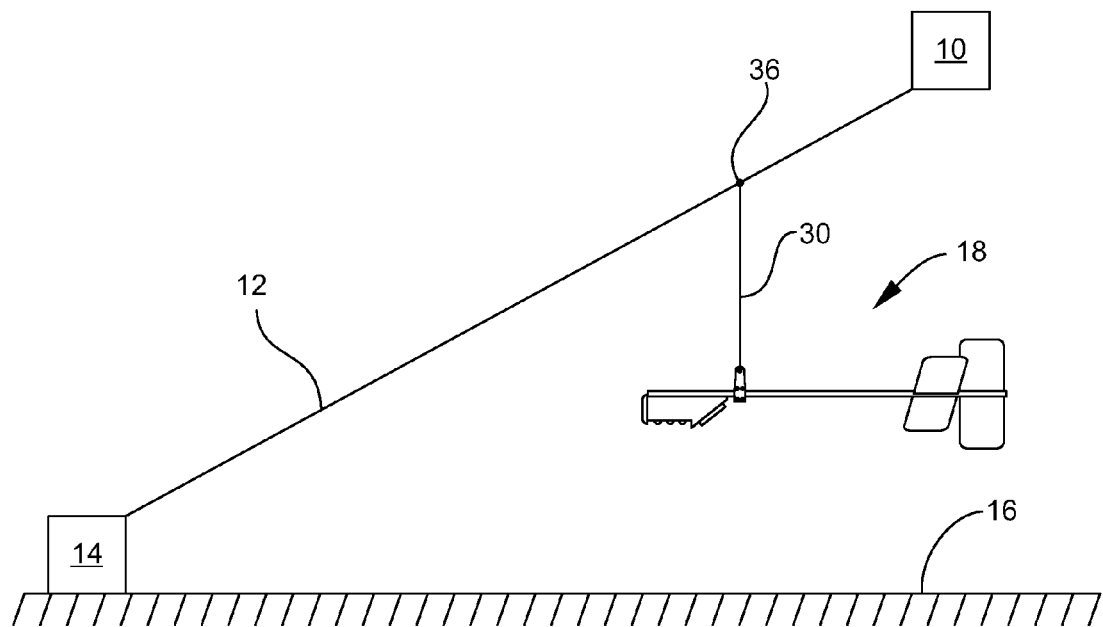
FIG. 2 shows an embodiment of a suspension apparatus connected to a tethered airborne platform.

FIG. 2 shows an embodiment of a suspension apparatus 18 connected to a tethered airborne platform 10. Airborne platform 10 may be connected to, for example, a winch 14 via a tether 12. Suspension apparatus 18 may be suspended from tether 12 with a suspension line 30 fixed at point 36, for example. To help prevent interference between suspension apparatus 18 and tether 12, a stand-off stick may be fixed between tether 12 and suspension line 30 in a known manner.

Figure 3:
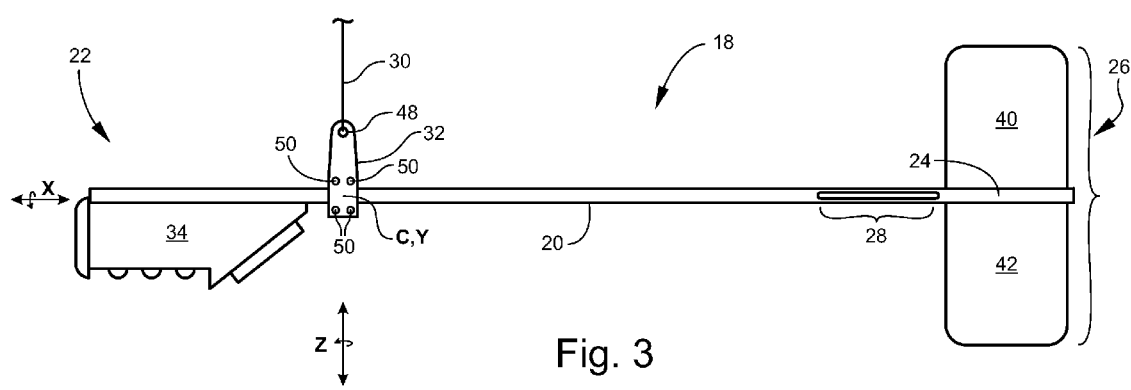
FIG. 3 is a side view of the suspension apparatus of FIG. 2.

FIG. 3 is a side view of the suspension apparatus 18 of FIG. 2. A suspension apparatus 18 may include a boom 20 having a longitudinal axis X, a payload end 22, and a tail end 24. A yaw stabilizer 26 may be disposed at the tail end 24 of the boom 20. In one embodiment, the yaw stabilizer 26 may be fixed with respect to the boom 20. Yaw stabilizer 26 may stabilize and dampen rotation of the apparatus 18 about the Z axis. Yaw stabilizer 26 may include planar surfaces 40, 42. Planar surfaces 40, 42 may be rigid. Planar surface 40 may extend above the X axis and planar surface 42 may extend below the X axis. Planar surfaces 40, 42 may be substantially symmetrical about the X axis. Planar surfaces 40, 42 may be, for example, rectangular.

Figure 4:
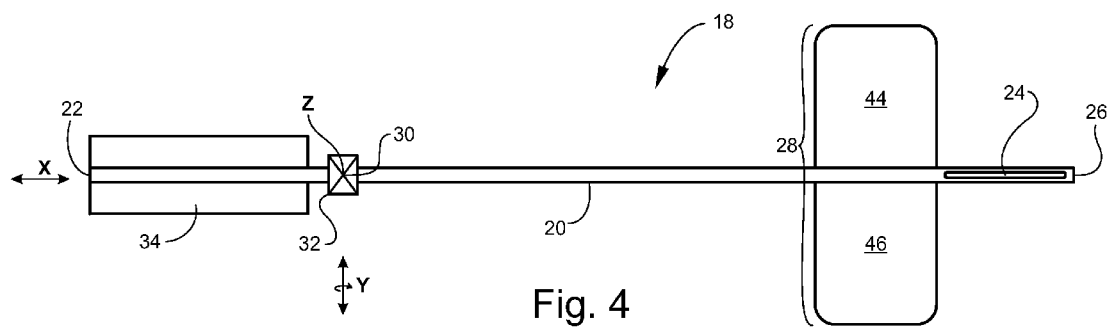
FIG. 4 is a top view of the suspension apparatus of FIG. 3.

FIG. 4 is a top view of the suspension apparatus 18 of FIG. 3. A pitch stabilizer 28 may be disposed at the tail end 24 of the boom. In FIG. 4, the pitch stabilizer 28 is shown disposed forward of the yaw stabilizer 26. In some embodiments, the yaw stabilizer 26 may be disposed forward of the pitch stabilizer 28. In other embodiments, the yaw stabilizer 26 and the pitch stabilizer 28 may be disposed at the same axial location on the tail end 24 of boom 20. In one embodiment, the pitch stabilizer 28 may be fixed with respect to the boom 20.

Pitch stabilizer 28 may stabilize and dampen rotation of the apparatus 18 about the Y axis. Pitch stabilizer 28 may include planar surfaces 44, 46. Planar surfaces 44, 46 may be rigid. Planar surface 44 may extend from one side of the X axis and planar surface 46 may extend from an opposite side of the X axis. Planar surfaces 44, 46 may be substantially symmetrical about the X axis. Planar surfaces 42, 44 may be, for example, rectangular. Pitch stabilizer 28 may be perpendicular to yaw stabilizer 26. Pitch stabilizer 28 may also stabilize and dampen roll of the apparatus 18 about the X axis.

Referring again to FIG. 3, a mast 32 may be selectively translatable along the boom 20. When a particular payload 34 is attached to apparatus 18, mast 32 is positioned axially along boom 20 at a center of gravity C of the combination of the boom 20, payload 34, yaw stabilizer 26, and pitch stabilizer 28. Mast 32 may be fixed to boom 20 with a clamp that may be loosened and tightened, for example with fasteners 50. Mast 32 may include an attachment point for suspension line 30, such as an opening 48.

A payload 34 may be attached to the payload end 22 of boom 20. The payload 34 may include instruments, such as imagers, cameras, sensors, etc., and may include a container or box for the instruments. The instruments may be directly fixed to the boom 20, or a container or box that holds the instruments may be fixed to the boom 20. A hook and loop fastener type of strap may be used to fix payload 34 to boom 20. Other means of fixing the payload 34 to the boom 20 may include screws, nylon ties, glues, and adhesives, for example. Because of the light-weight nature of many airborne platforms 10, payload 34 may have a weight in a range of about one or a few ounces to several pounds, or ten pounds or more. The length and cross-section of boom 20 may be increased for heavier payloads 34.

Boom 20 may be made of any suitable light-weight, strong material such as wood, plastic, carbon fiber composite, etc. Spruce wood may be used for boom 20. Boom 20 may have a circular or rectangular cross-section, for example. For payloads 34 up to about two pounds, boom 20 may have a major cross-sectional dimension (diameter for circle, side for rectangle) of about 0.5 inches and be up to four feet long. Yaw and pitch stabilizers 26, 28 may be made of a rigid material, for example, balsa wood or foam. Yaw and pitch stabilizers 26, 28 may be fixed to boom 20 by a variety of methods, for example, elastic bands, screws, glue, adhesive, etc. Mast 32 may be made of, for example, plywood or a carbon fiber composite.

The suspension line 30 may be, for example, about fifteen feet long. The length of line 30 may be adjusted prior to flight, or in flight. One way to adjust the length of line 30 in flight is to include a small electric motor-winch combination in the payload 34 and connect one end of line 30 to the motor-winch combination.

FIG. 5 is a side view of the tail end 24 of another embodiment of a suspension apparatus 18. In FIG. 5, yaw stabilizer 26 may include a portion 52 that may be fixed with respect to boom 20 and a portion 54 that may be movable with respect to boom 20. Movable portion 54 may be connected to fixed portion 52 using, for example, hinges 56. The position of movable portion 54 may be controlled via a servomotor (not shown) in a known manner. A power supply for the servomotor and a radio control receiver may be disposed with the payload 34 (FIG. 3).

Similarly, the pitch stabilizer 28 of FIG. 5 may include a portion 58 that may be fixed with respect to boom 20 and a portion 60 that may be movable with respect to boom 20. Movable portion 60 may be connected to fixed portion 58 using, for example, hinges 56. The position of movable portion 60 may be controlled via a servomotor in a known manner.

The movable portions 54, 60 of the yaw and pitch stabilizers 26, 28 may be used, for example, to adjust the attitude, orientation, or movement of apparatus 18.

What is claimed is:

1. A suspension apparatus for suspending a payload from an airborne platform, comprising:
    a boom having a longitudinal axis, a payload end, and a tail end;
    a yaw stabilizer made of a rigid material and disposed at the tail end of the boom;
    a pitch stabilizer made of a rigid material and disposed at the tail end of the boom;
    a mast that is selectively translatable along the boom wherein, when the payload is attached to the payload end of the boom, the mast is positioned axially along the boom at a center of gravity of the combination of the payload, boom, pitch stabilizer, and yaw stabilizer; and
    a suspension line fixed at one end to the mast and at another end to a tether of the airborne platform.

2. The suspension apparatus of claim 1, wherein the yaw stabilizer is fixed with respect to the boom.

3. The suspension apparatus of claim 1, wherein the pitch stabilizer is fixed with respect to the boom.

4. The suspension apparatus of claim 1, wherein at least a portion of the yaw stabilizer is movable with respect to the boom.

5. The suspension apparatus of claim 1, wherein at least a portion of the pitch stabilizer is movable with respect to the boom.

6. The suspension apparatus of claim 1, wherein the yaw stabilizer is substantially perpendicular to the pitch stabilizer.

7. The suspension apparatus of claim 1, wherein the pitch stabilizer is symmetric about the longitudinal axis of the boom.

8. The suspension apparatus of claim 1, wherein the yaw stabilizer is symmetric about the longitudinal axis of the boom.

9. The suspension apparatus of claim 1, wherein the yaw stabilizer comprises planar surfaces and the pitch stabilizer comprises planar surfaces.

10. The suspension apparatus of claim 1, wherein the payload is attached to the payload end of the boom and the mast is positioned axially along the boom at the center of gravity of the combination of the payload, boom, pitch stabilizer, and yaw stabilizer.

11. An apparatus, comprising:
    the suspension apparatus of claim 1;
    the airborne platform including a tether extending from the airborne platform to a control point; and
    a suspension line fixed at one end to the mast and at another end to the tether of the airborne platform.

12. The suspension apparatus of claim 11, wherein the yaw stabilizer is fixed with respect to the boom.

13. The suspension apparatus of claim 11, wherein the pitch stabilizer is fixed with respect to the boom.

14. The suspension apparatus of claim 11, wherein at least a portion of the yaw stabilizer is movable with respect to the boom.

15. The suspension apparatus of claim 11, wherein at least a portion of the pitch stabilizer is movable with respect to the boom.

16. The suspension apparatus of claim 11, wherein the yaw stabilizer is substantially perpendicular to the pitch stabilizer.

17. A suspension apparatus for suspending a payload from an airborne platform, comprising:
   a boom having a longitudinal axis, a payload end, and a tail end;
   a yaw stabilizer comprising a planar, rigid material, the yaw stabilizer being disposed at the tail end of the boom and fixed with respect to the boom;
   a pitch stabilizer comprising a planar, rigid material, the pitch stabilizer being disposed at the tail end of the boom forward of the yaw stabilizer and fixed with respect to the boom;
   a mast that is selectively translatable along the boom wherein, when the payload is attached to the payload end of the boom, the mast is positioned axially along the boom at a center of gravity of the combination of the payload, boom, pitch stabilizer, and yaw stabilizer; and
   a suspension line fixed at one end to the mast and at another end to a tether of the airborne platform.

18. The suspension apparatus of claim 17, wherein the yaw stabilizer and the pitch stabilizer are each symmetric about the longitudinal axis of the boom.

* * * * *